United States Patent
Spaan et al.

(10) Patent No.: US 10,322,697 B2
(45) Date of Patent: Jun. 18, 2019

(54) WIPER LIP FOR A WINDSHIELD WIPER DEVICE

(71) Applicant: Robert Bosch GmbH, Stuttgart (DE)

(72) Inventors: Marcel Spaan, Hasselt (BE); Michael Weiler, Buehl (DE); Peter Deak, Budapest (HU); Viktor Hackl, Sopron (HU); Wim Buseyne, Hasselt (BE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 15/328,531

(22) PCT Filed: Jul. 15, 2015

(86) PCT No.: PCT/EP2015/066177
§ 371 (c)(1),
(2) Date: Jan. 24, 2017

(87) PCT Pub. No.: WO2016/012328
PCT Pub. Date: Jan. 28, 2016

(65) Prior Publication Data
US 2017/0203725 A1    Jul. 20, 2017

(30) Foreign Application Priority Data
Jul. 24, 2014    (DE) ......................... 10 2014 214 578

(51) Int. Cl.
*B60S 1/34* (2006.01)
*B60S 1/38* (2006.01)

(52) U.S. Cl.
CPC ............... *B60S 1/38* (2013.01); *B60S 1/3436* (2013.01); *B60S 1/3459* (2013.01);
(Continued)

(58) Field of Classification Search
CPC ...... B60S 2001/3836; B60S 2001/3837; B60S 2001/3839; B60S 2001/3812;
(Continued)

(56) References Cited

U.S. PATENT DOCUMENTS 4,327,457 A * 5/1982 Lunsford ............... B60S 1/3801
15/250.03
4,622,712 A * 11/1986 Sugita ....................... B60S 1/38
15/250.48
(Continued)

FOREIGN PATENT DOCUMENTS

CN 101432170 A 5/2009
DE 2705700 * 8/1978
(Continued)

OTHER PUBLICATIONS

International Search Report for Application No. PCT/EP2015/066177 dated Oct. 12, 2015 (English Translation, 3 pages).

*Primary Examiner* — Gary K. Graham
(74) *Attorney, Agent, or Firm* — Michael Best & Friedrich LLP (57) ABSTRACT

The invention relates to a wiper lip (20) adapted to a windshield wiper device (20). The windshield wiper device (20) has an elongated, at least partially bendable upper part (10), an elongated, at least partially bendable lower part (12), and a plurality of connection elements (18) for connecting the upper part (10) and the lower part (12). The connection elements (18) are configured to allow a movement of the upper part (10) and of the lower part relative to one another with a movement component along a longitudinal extension (8) of the wiper blade (2). The wiper lip is configured such that the rigidity of the wiper lip in the wiper direction (1) is greater than the rigidity of the wiper lip vertical to the wiping direction.

13 Claims, 7 Drawing Sheets

(52) U.S. Cl.
CPC ..... *B60S 1/3801* (2013.01); *B60S 2001/3812* (2013.01); *B60S 2001/3813* (2013.01); *B60S 2001/3825* (2013.01); *B60S 2001/3829* (2013.01); *B60S 2001/3836* (2013.01); *B60S 2001/3837* (2013.01)

(58) Field of Classification Search
CPC ...... B60S 2001/3813; B60S 2001/3815; B60S 1/38; B60S 1/3801; B60S 1/3848; B60S 1/3459; B60S 2001/3825
USPC ............ 15/250.44, 250.43, 250.361, 250.41, 15/250.48
See application file for complete search history.

(56) References Cited

U.S. PATENT DOCUMENTS

| | | | | |
|---|---|---|---|---|
| 4,723,336 A | * | 2/1988 | Nakayama | B60S 1/524 15/250.04 |
| 5,107,563 A | * | 4/1992 | Zimmerman | B60S 1/38 15/250.48 |
| 7,555,806 B1 | * | 7/2009 | James | B60S 1/3801 15/250.41 |
| 2006/0059649 A1 | * | 3/2006 | Meredith | B60S 1/38 15/250.41 |
| 2016/0159322 A1 | * | 6/2016 | Weiler | B60S 1/3411 15/250.32 |

FOREIGN PATENT DOCUMENTS

| | | | |
|---|---|---|---|
| DE | 4317833 | | 12/1994 |
| DE | 102013214064 | | 5/2014 |
| FR | 2630383 | | 10/1989 |
| FR | 2706397 | | 12/1994 |
| GB | 1316781 | * | 5/1973 |
| JP | 603151 | | 1/1985 |
| WO | 2015032580 | | 3/2015 |

* cited by examiner

WIPER LIP FOR A WINDSHIELD WIPER DEVICE

BACKGROUND OF THE INVENTION

The invention relates to a window wiper device for a vehicle, in particular a motor vehicle, and furthermore in particular a wiper lip for a window wiper device.

Window wiper devices typically have a wiper arm or wiper lever, wherein a wiper blade to which a wiper lip is fastened is moved on the window of a motor vehicle. The wiper arm is moved in alternating fashion between a first turning point and a second turning point. For this purpose, the wiper arm is connected by way of the drive shaft to a wiper motor. In particular on windshields with intense changes in curvature, the wiper blade with the wiper lip easily loses contact with the window. This can give rise, in particular in the case of intensely curved windows, to non-wiped wiping areas and/or to smearing.

In the case of window wiper devices known from the prior art, a noise is commonly generated upon the reversal of the wiper arm at the turning points, which noise is, in particular depending on the motor vehicle and/or a driving situation of the motor vehicle, perceived as disturbing. Said noise is caused in particular by the fact that, during a reversal of the movement direction of the wiper arm or of the wiper blade, the wiper lip is initially turned upright, wherein the wiper arm is forced away from the window, and subsequently folds over in the respective other direction. During the folding-over, the wiper arm together with the wiper blade is accelerated in the direction of the window. Here, the wiper blade moves in the direction of the window and is then abruptly braked. As a result of the acceleration and the braking, an impact against the window occurs, which generates the noise. It is therefore sought to further improve window wiper devices, in particular to prevent or at least reduce noises of the window wiper device.

Furthermore, the wiping movement can lead to torsion of the wiper arm, that is to say to torsion about an axis which substantially corresponds to the longitudinal extent of the wiper arm or wiper blade. Such torsion may even, in the case of conventional window wiper devices, lead to contact between the wiper arm and a window. It is therefore also sought to reduce the torsion of the wiper arm.

In improving window wiper devices, there are numerous boundary conditions that should be taken into consideration. These include the outlay for production or the production costs, the material costs, and also the characteristics of the window wiper device, in particular the function under a variety of conditions and the durability under a multiplicity of conditions. Here, in the case of wiper devices for vehicles, it must be taken into consideration that the cost pressure is ever-increasing, and that vehicles may be used in a multiplicity of climatic conditions, such that, for example, extreme temperature values are encountered permanently and/or with great fluctuations.

SUMMARY OF THE INVENTION

It is the object of the present invention to provide a wiper lip by means of which at least one or more of the above-stated disadvantages are reduced or substantially do not arise.

In embodiments of the present invention, a wiper lip is provided which is adapted for a window wiper device having a wiper blade with an elongate upper part and with an elongate lower part, which are at least partially of flexible form. Furthermore, the window wiper device to which the wiper lip is adapted has multiple connecting elements for connecting the upper part and the lower part, which connecting elements are spaced apart from one another along a longitudinal extent of the wiper blade. Furthermore, the connecting elements are designed to permit a movement of the upper part and of the lower part relative to one another with a movement component along a longitudinal extent of the wiper blade. The window wiper device is adapted for a vehicle, in particular motor vehicle. The wiper lip comprises a cantilever for reducing the stiffness perpendicular to the wiping direction, in particular a cantilever with a wiper edge and with a surface, situated opposite the wiper edge perpendicularly to the wiping direction, of the cantilever, wherein the opposite surface is adjoined by a gap or a cavity; a base surface by which the cantilever is connectable or connected to the lower part; and a further cantilever for reducing the stiffness perpendicular to the wiping direction, wherein the further cantilever is connectable or connected at the base surface to the lower part.

In embodiments of the present invention, a wiper lip is provided which is adapted for a window wiper device having a wiper blade with an elongate upper part and with an elongate lower part, which are at least partially of flexible form. Furthermore, the window wiper device to which the wiper lip is adapted has multiple connecting elements for connecting the upper part and the lower part, which connecting elements are spaced apart from one another along a longitudinal extent of the wiper blade. Furthermore, the connecting elements are designed to permit a movement of the upper part and of the lower part relative to one another with a movement component along a longitudinal extent of the wiper blade. The window wiper device is adapted for a vehicle, in particular motor vehicle. The wiper lip is configured such that the stiffness of the wiper lip in a wiping direction is greater than the stiffness of the wiper lip perpendicular to the wiping direction, and the wiper edge with the highest contact pressure is shifted in the direction of the forward edge relative to the middle in the direction of the wiping direction.

In a further embodiment of the invention, a window wiper device for a vehicle, in particular a motor vehicle, is provided. The window wiper device comprises an elongate upper part, which is at least partially of flexible form, an elongate lower part, which is at least partially of flexible form, and multiple connecting elements for connecting the upper part and the lower part. The connecting elements are spaced apart from one another along a longitudinal extent of the wiper blade and are designed to permit a movement of the upper part and of the lower part relative to one another with a movement component along a longitudinal extent of the wiper blade. Furthermore, the window wiper device comprises a wiper lip. The wiper lip comprises a cantilever for reducing the stiffness perpendicular to the wiping direction, in particular a cantilever with a wiper edge and with a surface, situated opposite the wiper edge perpendicularly to the wiping direction, of the cantilever, wherein the opposite surface is adjoined by a gap or a cavity; a base surface by which the cantilever is connectable or connected to the lower part; and a further cantilever for reducing the stiffness perpendicular to the wiping direction, wherein the further cantilever is connectable or connected at the base surface to the lower part.

In a further embodiment of the invention, a window wiper device for a vehicle, in particular a motor vehicle, is provided. The window wiper device comprises an elongate upper part, which is at least partially of flexible form, an elongate lower part, which is at least partially of flexible form, and multiple connecting elements for connecting the upper part and the lower part. The connecting elements are spaced apart from one another along a longitudinal extent of the wiper blade and are designed to permit a movement of the upper part and of the lower part relative to one another with a movement component along a longitudinal extent of the wiper blade. Furthermore, the window wiper device comprises a wiper lip according to the embodiments described herein.

Preferred optional embodiments and particular aspects of the invention will emerge from the dependent claims, from the drawings and from the present description.

According to the embodiments described herein, it is possible for a fin-ray window wiper device for vehicle windows to be produced in a particularly expedient manner and/or for a multiplicity of different fields of use. The present embodiments of the window wiper device with the wiper lip according to the embodiments described herein permit a particularly good adaptation to the curvature of a window. This ensures particularly good and precise wiping of the window. Non-wiped regions of the window and smearing on the window can be substantially prevented. The structural design of the wiper lip described herein makes it possible to realize a substantially uniform contact pressure of the wiper lip on the window, such that a high level of wiping quality is provided, and a noise, in particular upon a reversal of the movement direction of the wiper arm or of the wiper blade at a turning point, is eliminated or at least reduced. In addition or alternatively, a reduction of the torsion of the wiper arm can be realized. The wiper lips described here may be combined in an expedient manner with fin-ray window wiper devices, because these are, owing to their geometrical design, suitable for the use of the wiper lips described here.

In further typical embodiments, the cantilever and the further cantilever may extend, proceeding from the base surface, in each case in a direction parallel to the wiping direction and in an opposite direction, wherein in particular, the base surface is a base surface arranged substantially in the middle. In this way, it is possible to realize a shift of the dominant wiper edge to the forward side in the wiping direction.

In further typical embodiments, the wiper edge may be integrated in the cantilever or in the further cantilever, in particular, the wiper edge and the cantilever may be composed of the same material. Alternatively, the wiper edge may be mounted on the cantilever or on the further cantilever or may be applied as a coating to the cantilever, wherein in particular, the wiper edge and the cantilever comprise different materials. In the case of an integrated solution, it is advantageously possible for the wiper lip or possibly even the wiper blade device to be provided in ready-from-the-mold form. By contrast to this, an assembly process must take place in the case of a two-part solution. On the other hand, the assembly may also lead to a simplified exchange of the wiper edge, and/or may permit an improved material selection for the wiper edge. These alternatives may be optimized in favor of one or the other direction in a manner dependent on the application. For example, the base surface may, in a cross section perpendicular to the longitudinal extent of the wiper lip, be arranged between the wiper edge and the further wiper edge.

In further typical embodiments, the cantilever and the further cantilever may form a substantially T-shaped structure. In this way, it is possible to realize simple assembly of the two wiper edges and/or reduced torsion.

In embodiments of the disclosure that may be combined with other embodiments described herein, the wiper edge has an angle of 60° to 120°, in particular 90°. A wiper edge with particularly high wiping quality is thus provided.

In embodiments of the disclosure that may be combined with other embodiments described herein, the wiper edge is composed of a material from the group comprising: TPE (thermoplastic elastomer), in particular TPE-S, TPE-O, TPE-U, TPE-A, TPE-V, TPE-E; ethylene propylene diene monomer (EPDM); polychloroprene and natural rubber. The material selection of the wiper edge makes it possible to set the physical characteristics of the wiper edge.

Furthermore, window wiper devices having wiper lips as per the embodiments described herein are provided. For example, the cantilever is formed in one piece with the lower part, wherein in particular, the lower part and the cantilever are composed of the same material. In this way, it is possible to provide a ready-from-the-mold window wiper device or a window wiper device in which only the wiper edge is exchangeable, which window wiper device furthermore has the advantages of the wiper lips described herein. If necessary, it is possible, instead of the exchangeable wiper edge or in addition to the exchangeable wiper edge, for a detachably connectable wiper lip or a detachably connectable cantilever to be provided. Owing to the separation of wiper lip and lower part of the window wiper device, it is possible, for some applications, to realize inter alia an improved material selection for the individual element.

In a further embodiment, a method for exchanging a wiper edge of a wiper lip for a window wiper for a motor vehicle, in particular a wiper lip according to one of the embodiments described here, is provided. The method comprises pushing the wiper edge or the cantilever in along the longitudinal extent of the wiper edge, or attaching the wiper lip by adhesive bonding. In this way, an exchange of the wiper edge is possible with low or reduced material costs for the part to be exchanged.

BRIEF DESCRIPTION OF THE DRAWINGS

Exemplary embodiments of the invention are illustrated in the figures and will be described in more detail below. In the figures:

FIG. 7B shows an enlarged detail of FIG. 7A, FIGS. 8A to 8C are schematic illustrations of variants for the fastening of wiper lip according to embodiments of the present invention to window wiper devices as per embodiments of the present invention.

DETAILED DESCRIPTION

Below, unless stated otherwise, the same reference designations are used for identical elements and elements of identical action.

Figure 1A:
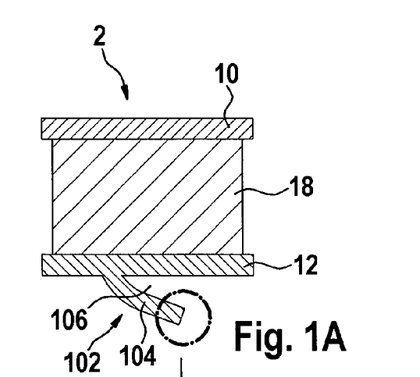
FIG. 1A is a schematic illustration, in cross section, of a window wiper device having a wiper lip according to embodiments of the present invention.

FIG. 1A shows a cross section along the longitudinal extent of a window wiper device 2. An upper part 10 and a lower part 12 are connected by way of multiple connecting elements 18, wherein, in the respective cross sections shown here, in each case only one connecting part 18 is visible. The design of the window wiper devices in which the embodiments of wiper lips described here can be integrated particularly easily owing to the geometry of the window wiper devices are described by way of example in FIGS. 4A, 4B, 5A, 5B and 6.

During the operation of the window wiper device 2, the lower part 12 faces toward a window, for example a window of a motor vehicle. The window wiper device 2 furthermore comprises a wiper lip 102. The wiper lip 102 comprises a cantilever 104, as illustrated for example in FIG. 1A, and a wiper edge 112, as illustrated for example in FIG. 1B. The cantilever 104 is designed such that a gap 106 is provided between the cantilever 104 and the lower part 12. The gap 106 increases the elasticity and reduces the stiffness in a direction perpendicular to the wiping direction. As can be seen by way of example in FIG. 1A, the wiping direction is in this case in a horizontal direction. Thus, in FIG. 1A, the stiffness is reduced in a vertical direction.

Figure 1B:
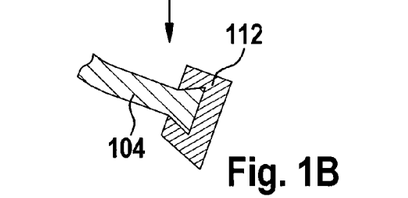
FIG. 1B shows a detail of a wiper lip according to embodiments of the present invention.

The wiper edge 112 is provided on the cantilever 104. Said wiper edge may, as illustrated in FIG. 1B, be configured for example with an undercut, such that the wiper edge 112 can be pushed onto the cantilever 104. In other embodiments that may be combined with the embodiments described here, the wiper edge 112 may also be formed integrally with the cantilever 104. In this way, it is possible to realize simplified production. It must however be kept in mind that, in this case, the material of the cantilever 104 should also be suitable as a wiper edge 112, such that a satisfactory wiping result is realized in the case of contact of said material with a window.

In the embodiment illustrated by way of example in FIG. 1A, the lower part 12 and the cantilever 104 are formed in one piece. For example, the lower part 12 and the cantilever 104 may be produced in one working step and/or in one piece from one material. It is furthermore possible for the window wiper device 2 to be produced in one piece, or provided in one piece, with the upper part 10, the connecting elements 18, the lower part 12 and the cantilever 104. In such a situation, in particular in the case of a wiper lip 112 provided integrally with the cantilever 104, it is possible for a window wiper device 2 to be produced in ready-from-the-mold form. In other embodiments that may be combined with the embodiments described here, and as described with reference to further figures, a cantilever may also be fastened to or mounted on the lower part 12. A two-part or multi-part form of the lower part 12 and of the cantilever 104 leads, in this context, to increased flexibility in the material selection for the individual components.

By way of the cantilever 104, a gap 106 or a cavity is realized by way of which the stiffness of the wiper lip 102 perpendicular to the wiping direction is reduced. Thus, in embodiments of the present invention, it is possible for a wiper lip to be provided which has a stiffness in a wiping direction higher than the stiffness perpendicular to the wiping direction. In this way, a folding-over of the wiper lip can be prevented. The folding-over would lead to disturbing background noises during the operation of a motor vehicle.

Figure 3:
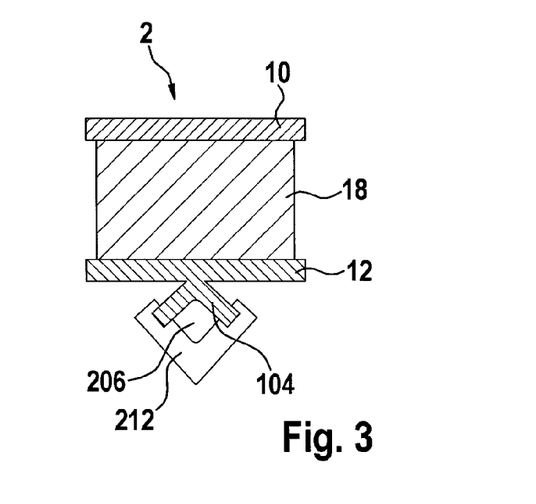
FIG. 3 is a schematic illustration of a further window wiper device having a further wiper lip according to embodiments of the present invention.

In some embodiments that may be combined with the embodiments mentioned here, and as illustrated in FIG. 1A, the cantilever 104 may be composed of the same material as the lower part 12 and/or as the window wiper device 2, for example a fin-ray structure. FIG. 3 describes an embodiment in which the cantilever and/or the wiper lip with the cantilever is produced from a different material. As an interface to the window, that is to say for cleaning purposes, an additional rubber-like element may be selected. In this way, a relatively inexpensive material can be used for influencing the stiffness or the spring action of the cantilever. For the rubber edge, that is to say the wiper edge 112, use may be made of a high-quality or expensive rubber edge material, wherein the material usage is reduced to a minimum.

In further embodiments that may be combined with the embodiments described here, the stiffness of the cantilever may be variable over the length of the window wiper device 2, that is to say along the longitudinal extent 8 of the window wiper device 2, that is to say may be spatially variable. In this way, force fluctuations that may exist along the longitudinal extent of the window wiper device 2 can be adapted by way of the adapted stiffness of the cantilever 104.

In further embodiments, the gap or the gaps 106 may be filled. In the most common case, said gap may be unfilled, that is to say filled only with air or ambient air. Said gap may however also be filled with a compressible medium or an elastic material. Said material typically has a modulus of elasticity lower, by at least a factor of 2, than that of the material of the cantilever 104, in particular a material with a modulus of elasticity lower by a factor of 10.

Figure 2:
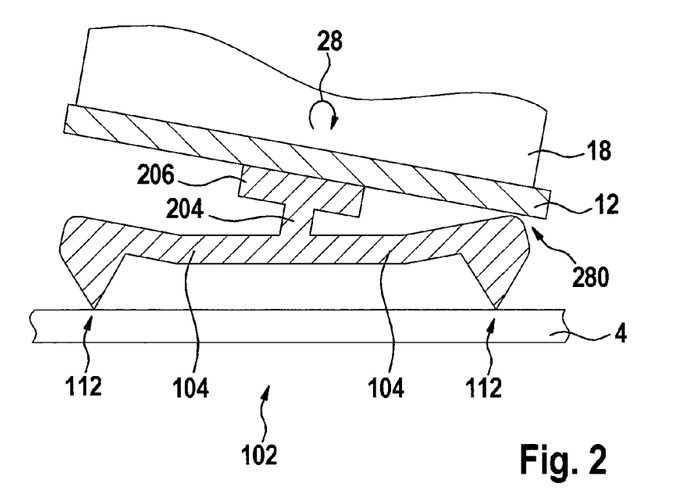
FIG. 2 is a schematic illustration of a further window wiper device having a further wiper lip according to embodiments of the present invention.

FIG. 2 shows an embodiment of a window wiper device in which 2 cantilevers 104 are provided in the lower part 12. FIG. 2 shows a detail of a window wiper device, wherein the lower part 12 and a part of a connecting element 18 are illustrated. To the lower part 12 there is fastened a wiper lip 102 which is provided on a window 4, for example a window of a motor vehicle. In some embodiments, the wiper lip 102 has a fastening region 206. Said fastening region may extend along the longitudinal extent of the window wiper device. Between the fastening region 206 and the cantilever 104 there is provided a connecting region 204. The connecting region 204 may provide a predefined elasticity which permits torsion (see arrow 28). The connecting region 204 may thus be regarded as an elongation of the cantilever 104, which permits elasticity or bending in a direction perpendicular to the wiping direction.

In typical embodiments, the connecting region 204 is arranged between a first cantilever 104, for example the left-hand cantilever in FIG. 2, and a second cantilever, for example the right-hand cantilever in FIG. 2. In embodiments described here, the cantilevers extend outward from a contact position with the lower part 12, which is arranged for example approximately in the middle on the lower part 12. For example, the fastening region 206 may be arranged between a wiper edge 112 on the first cantilever and a wiper edge 112 of the second cantilever. This leads, in the event of torsion as illustrated by arrow 28, to a situation in which the leading wiper lip 112, that is to say the wiper lip situated in front in the wiping direction, is subjected to a greater pressing force in relation to the wiper lip situated at the rear in the wiping direction. In some embodiments described here, the contact between the window wiper device and the window is shifted in the direction of the front side of the lower part 12, that is to say the front side in the wiping direction.

In the event of torsion of the wiper blade as illustrated by arrow 28, the embodiment of the wiper lip 102 leads to abutment 280 between a part of the cantilever 104 and the lower part 12 or another corresponding support structure of the window wiper device. In FIG. 2, by way of example, a wiping direction toward the right is illustrated. On one side, the displacement of the center of gravity of the window contact toward that edge of the wiper arm which is situated at the front in the wiping direction leads to a reduction of the torsion. At the other side, the abutment 280 prevents contact between the wiper arm, for example the lower part 12, and the window.

The shift of the center of gravity of the window contact toward that end of the wiper arm which is situated at the front in the wiping direction generates an additional moment which opposes the moment generated by the friction force. Furthermore, the more intense contact of a wiper edge 112 assists in realizing improved sealing of the wiper edge against the window.

Therefore, in embodiments of the present invention, it is possible to provide a wiper lip or a window wiper device which provides improved contact or improved sealing against the window. It is also possible for the risk of a collision between the wiper arm structure, for example the lower part 12, and the window to be reduced. This is possible inter alia by virtue of the fact that the contact point or the dominant contact point of the window wiping device with the window is not situated behind the central point of the wiper arm, or a support element of the wiper arm, in the wiping direction, whereby the torsion is increased, but rather is shifted forward in the wiping direction or is situated in front, in the wiping direction, of the middle of a support element such as for example the lower part 12, whereby the torsion is reduced.

It is possible for the risk of contact between wiper arm, that is to say a support element of the wiper arm, and the window to be reduced, which can lastingly not lead to damage, noise and undesired instabilities. The embodiment by way of a cantilever can furthermore reduce the folding-over of the wiper lip, which leads to a reduced folding-over noise. The second wiper edge, which is provided in some embodiments, leads to greater stability of the wiping action. In particular, the dominance of the front wiper edge, that is to say of the wiper edge that is situated in front in the wiping direction, can lead to good sealing against the window.

In typical embodiments, the two cantilevers and the two wiper edges are of symmetrical or approximately symmetrical construction. By way of the shape, that is to say by way of the typically symmetrical shape of the two wiper edges, it can be possible for the bending moment (normal force*lever arm) to be substantially cancelled out. This results in a reduced bending moment. An influence of the normal force can be reduced in relation to known wiper lips, in the case of which the spacing between the contact position of the wiper edge on the window and the middle of the lower part is dependent on the acting normal forces and/or on the bending of the wiper lip. In the case of the design with two edges, the spacing between the contact position of the wiper edge on the window to the middle of the lower part is influenced less by the acting normal forces.

In the case of conventional wiper edge profiles, in which the wiper lip wipes proceeding from an inclined position and with an unclear movement, the torsion moment that is generated by the friction force between the wiper lip and the window is intensified by the pressing force between the wiper edge and the window. In the case of an individual wiper edge which does not fold over, as illustrated for example in FIG. 3, a torsion moment is generated substantially by the friction force. The influence of the pressing force is in this case small. Such an embodiment, as illustrated in FIG. 3, may however in some embodiments provide the advantage of a limitation of the torsion, for example by way of an abutment.

By way of a wiper lip having two wiper edges, in which, in embodiments of the invention, the dominant contact point is shifted toward that side of a support element for the wiper lip, for example the lower part 12, which is situated in front in the wiping direction, a torsion moment is generated which opposes the torsion moment generated by the friction force.

FIG. 3 shows an embodiment in which two cantilevers are provided on the lower part 12. A wiper edge 212 can be pushed onto the structure of the two cantilevers 104, wherein one edge is provided which comes into contact with the window during the wiping process. The wiper edge 212 or the cantilever or cantilevers 104 may be equipped with an undercut such that a reliable fastening during the pushing or clamping of the wiper lip 212 onto the cantilever 104 is provided. In addition to a gap between the respective cantilever 104 and the lower part 12 of the window wiper device 2, a further cavity 106 illustrated in FIG. 3 is provided. The cavity 106 may be designed so as to further influence the stiffness of the wiper lip perpendicular to the wiping direction.

The pushing of the wiper lip 212 into, or clamping of the wiper lip 212 onto, the structure of a cantilever or, as illustrated in FIG. 3, of a structure composed of two cantilevers 104 permits a simple replacement of the wiper lip 212 for a window wiper device 2, for example a fin-ray wiper. In this way, for the commercial market, a simple option for replacing the wiper lip of a window wiper device 2 can be provided. Owing to the fact that only the wiper lip is exchanged, reduced or minimal material outlay is required for the exchange. This is expedient inter alia with regard to the ever-increasing efforts being made from an ecological aspect.

Below, an exemplary window wiper device will be described for which the wiper lip described herein can be used. It is however basically possible for the wiper lip described herein to also be used for other window wiper devices.

Figure 4A:
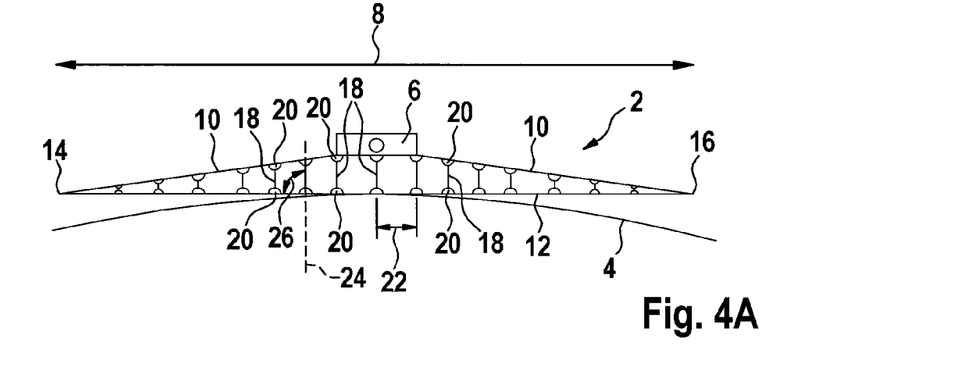
FIG. 4A is a schematic illustration of a wiper blade of a window wiper device according to embodiments of the disclosure in a basic position.
Figure 4B:
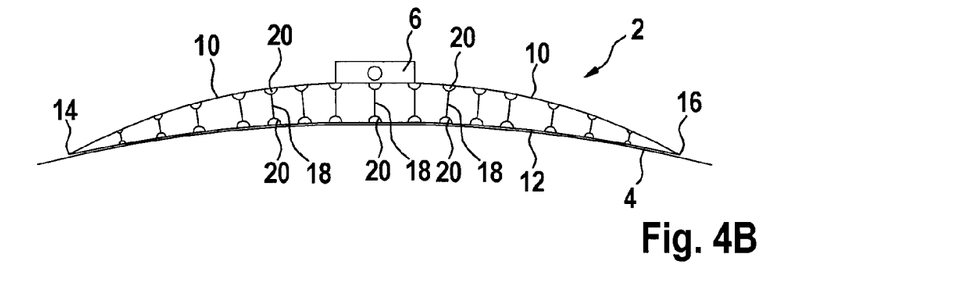
FIG. 4B is a schematic illustration of the wiper blade of a window wiper device according to embodiments of the disclosure as per FIG. 4A in a position placed against a window.

FIGS. 4A and 4B are schematic illustrations of a wiper blade 2 in a basic position (FIG. 4A) and in a position placed against a window (FIG. 4B) according to embodiments of the window wiper device of the disclosure. The wiper blade 2 serves for wiping a window 4 of a vehicle, which is for example a motor vehicle, in particular an automobile. The wiper blade 2 is normally attached to a window wiper arm which, for the wiping action, is driven by way of a motor. For this purpose, the wiper blade 2 has a bracket 6 by which it can be fastened to the window wiper arm. In FIG. 4A, the wiper blade 2 is situated in a basic position, in which it is at least partially raised from the window 4. The wiper blade 2 has a longitudinal extent 8 and has an elongate upper part 10 and a likewise elongate lower part 12. The longitudinal extent of the upper part 10 and of the lower part 12 substantially correspond to the longitudinal extent 8 of the wiper blade 2.

Both the upper part 10 and the lower part 12 are, or may be designed as, flexible beams which, in FIGS. 4A and 4B, are for example in each case of unipartite form. This makes it possible to realize a particularly stable construction. It is likewise possible for only in each case one part of the upper part 10 and/or of the lower part 12 to be designed to be flexible. Furthermore, it is alternatively possible for the upper part 10 to be of two-part form, wherein then, in each case one end of the two parts of the two-part upper part 10 is fastened to the bracket 6.

In some embodiments that may be combined with the other embodiments described here, for the upper part 10 and/or the lower part 12, a material is used which has a modulus of elasticity which lies in a range between 0.005 kN/mm² and 0.5 kN/mm², in particular 0.01 kN/mm² and 0.1 kN/mm². This makes it possible to realize suitable flexibility of the upper part 10 and of the lower part 12. Together with a suitably designed cross-sectional area of the upper part 10 and of the lower part 12, optimum flexural stiffness is thus realized. The upper part 10 and the lower part 12 are arranged so as to be situated opposite one another. Both ends of the upper part 10 are fixedly connected, at outer connecting positions 14 and 16, to in each case one end of the lower part 12. Otherwise, the upper part 10 and the lower part 12 are spaced apart from one another.

The upper part 10 and the lower part 12 are connected to one another by way of connecting elements 18. In particular in the basic position of the wiper blade 2, said connecting elements run approximately transversely with respect to the longitudinal extent 8 of the wiper blade 2. The connecting elements 18 are fastened by way of rotary joints 20 to inner longitudinal sides, which face toward one another, of the upper part 10 and of the lower part 12. Here, the rotary joints 20 are hinges. In particular, the rotary joints 20 may be in the form of film hinges. This is advantageous in particular if the upper part 10, lower part 12 and/or connecting elements 18 are produced from a plastics material or are lined with a suitable plastics material.

In typical embodiments described here, which may be combined with other embodiments described here, a rotary joint is selected from the group comprising: a hinge, a film hinge, a narrowing of the material in order to realize relatively low stiffness along a torsional axis, a joint with an axis of rotation, a means for connecting the upper part to the connecting element or for connecting the lower part to the connecting element, which means permits the displacement of the lower part relative to the upper part along the longitudinal extent, etc.

Embodiments in which the joint is provided by a film hinge thus provide a very simple way of providing the joints for a fin-ray wiper. The wiper blade 2 may be provided in unipartite, in particular ready-from-the-mold form. In typical embodiments, the film hinges exhibit high extensibility. This may be achieved for example by way of a material selected from the group PP, PE, POM and PA. Alternatively, the film hinges may be produced from one or more materials from a group comprising: thermoplastic elastomer (TPE), for example TPE-S, TPE-O, TPE-U, TPE-A, TPE-V and TPE-E.

The connecting elements 18 are spaced apart from one another along the longitudinal extent of the wiper blade 2. The spacings between in each case two adjacent connecting elements 18 are equal. Said spacings may however also be selected so as to differ. The spacings are advantageously less than 50 mm, in particular less than 30 mm. In this way, it is possible to ensure a particularly high level of flexibility of the window wiper device, in particular of its lower part, and good adaptation to the curvature and changes in curvature of the window to be wiped. In FIG. 4A, one spacing 22 is illustrated as a representative of the spacings between in each case two connecting elements 18. The connecting elements 18 are, in particular in the basic position of the wiper blade 2, fastened to the lower part 12 such that their longitudinal axes run at angles 26 of between 65° and 115°, in particular between 75° and 105°, with respect to the lower part 12. The angles particularly advantageously lie between 80° and 100°. This advantageously ensures that a force acting on the lower part is transmitted in a particularly effective manner to the upper part. Furthermore, a particularly stable window wiper device can be realized in this way. A corresponding situation applies to the fastenings of the connecting elements 18 to the upper part 10.

In the present exemplary embodiment, a corresponding situation applies to the fastenings of the connecting elements 18 to the upper part 10.

In FIG. 4A, one longitudinal axis 24 is illustrated as an example of the longitudinal axes of the connecting elements 18, and one angle 26 is illustrated as an example of the angles between the connecting elements 18 and the lower part 12. The spacings between the upper part 10 and the lower part 12 are defined primarily by the lengths of the connecting elements 18. The lengths of the connecting elements 18 increase in size proceeding the two outer connecting positions 14, 16 as far as approximately the locations at which the bracket 6, which is attached to the upper part 10, begins. In this way, in the side view of the wiper blade 2 as per FIG. 4A, the upper part 10 and lower part 12 form a double wedge, wherein the tips of the two wedges point in opposite directions. The connecting elements 18 are designed to be resistant to buckling.

FIG. 4B is a schematic illustration of the wiper blade 2 as per FIG. 4A in a position placed against the window 4. Since the window 4 has a curvature, it is the case that, when the wiper blade 2 bears against the window 4, contact pressure forces act on the lower part 12. Since the upper part 10 and the lower part 12 are flexible beams and the connecting elements 12 are mounted rotatably on the upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the window 4.

Owing to the construction of the embodiments described here, it is the case that, when a force is exerted on the lower part (by the window 4), the lower part bends in the direction from which the force acts. This is realized by way of the connection of the upper part 10 and of the lower part at a connecting positions 14 and/or 16, the shape, and by way of rotary joints at the connection between the connecting elements and the upper part and lower part.

In the illustration as per FIG. 4B, there is a small spacing between the wiper blade 2 and the window 4, which spacing serves here merely for the illustration of the window 4 and of the wiper blade 2 and, in reality, substantially does not exist when the wiper blade 2 bears against the window 4. Furthermore, a wiper lip 102 according to the embodiments described herein, as illustrated by way of example in FIG. 1, is typically situated on the lower side, averted from the upper part 10, of the lower part 12, which wiper lip is set down on the window 4 for wiping purposes. For reasons of clarity, the wiper lip is not illustrated in FIGS. 4A and 4B.

A window wiper device according to embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle. In this way, a window wiper device according to the embodiments described herein has the advantage of improved adaptation to a window of a motor vehicle. In the case of a conventional window wiper blade, the upper part thereof is conventionally rigid, that is to say is not designed to be flexible.

FIGS. 4A and 4B show a wiper blade 2 with a longitudinal extent 8, which extends substantially between the connecting positions 14 and 16. Such an arrangement is commonly used for front window wipers. Alternatively, a window wiper device may however also have only one connecting position, which, in analogy to FIGS. 4A and 4B, corresponds to a halving of the window wiper device, and wherein an axis of rotation is provided for example at a position of the bracket 6. Such an arrangement is commonly used for rear window wipers. This is illustrated by way of example inter alia in FIGS. 5A and 5B. Optional refinements and details such as are described in the individual embodiments may be used generally for both variants of an arrangement of a window wiper device.

Figure 5A:
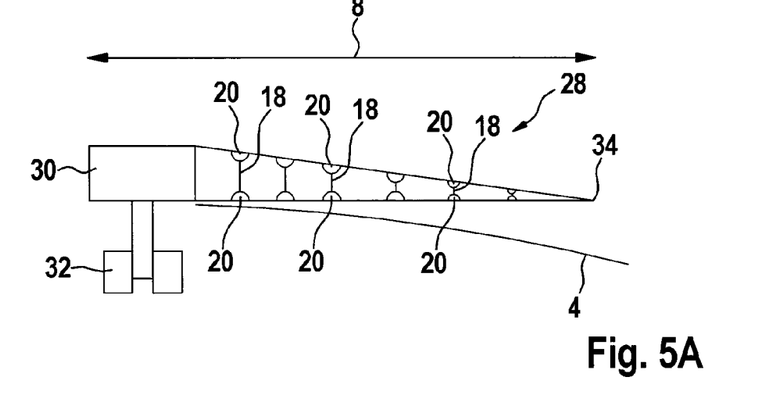
FIG. 5A is a schematic illustration of a further exemplary embodiment of a window wiper device according to the invention in the form of a wiper arm with integrated wiper blade in a basic position.

FIG. 5A is a schematic illustration of a further exemplary embodiment of the window wiper device according to the invention in the basic position. Here, the window wiper device is a wiper arm with an integrated wiper blade 2 which is attached to a fastening part 30. The fastening part 30 is connected to a wiper motor 32 which drives the fastening part 30 in order to wipe the window 4. The wiper blade 2 is of wedge-shaped design, wherein one end of the upper part 10 is fixedly connected at an outer connecting position 34 to one end of the lower part 12. The respective other ends of the upper part 10 and of the lower part 12 are fastened to the fastening part 30. With regard to the basic construction and in particular the fastenings of the connecting elements 18, the window wiper device as per FIG. 5A corresponds in principle to that as per FIG. 4A.

Figure 5B:
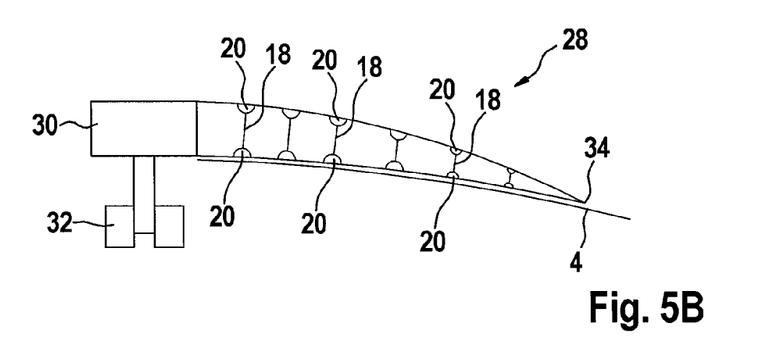
FIG. 5B is a schematic illustration of the wiper arm with integrated wiper blade as per FIG. 7A in a position placed against a window.

FIG. 5B is a schematic illustration of the wiper blade 2 with integrated wiper arm 30 as per FIG. 5B in a position placed against the window 4. In this case, too, pressure forces act on the lower part 12 of the wiper blade 2 from below from the direction of the window 4, such that the lower part 12 and the upper part 10 bend in the direction of the window 4.

Both in FIG. 4A and in FIG. 5A, the wiper blade is illustrated in its position in which it has not been placed against the window, such that the lower part 12 is of substantially straight form. According to yet further embodiments that may be combined with other embodiments, the lower part is, in the unloaded state, of convex form, that is to say with a curvature which projects away from the upper part in a central region. Upon coming into contact with a window, the window wiper device as per the embodiments described here can typically then, proceeding from the convex shape of the lower part, assume the corresponding concave shape, which adapts to the window, of the lower part.

In a further preferred embodiment, the multiple connecting elements may be connected at multiple upper connecting positions to the upper part and at multiple lower corresponding connecting positions to the lower part, wherein, during the movement of the upper part and of the lower part relative to one another, the spacing between an upper connecting position and a corresponding lower connecting position is substantially constant, in particular is constant with a deviation of ±1 mm. In this way, it is possible to realize a transmission force between the upper part and the lower part which makes it possible to realize a window wiper device which operates in accordance with the fin-ray principle.

The connecting elements 18 are fastened to inner longitudinal sides, facing toward one another, of the upper part 10 and of the lower part 12 by way of rotary joints 20. The rotary joints 20 are typically hinges. In particular, the rotary joints 20 may be in the form of film hinges. This is advantageous in particular if the upper part 10, the lower part 12 and/or the connecting elements 18 are produced from a plastics material or are lined with a suitable plastics material.

In typical embodiments described here, which may be combined with other embodiments described here, a rotary joint is selected from the group comprising: a hinge, a film hinge, a narrowing of the material in order to realize relatively low stiffness along a torsional axis, a joint with an axis of rotation, a means for connecting the upper part to the connecting element or for connecting the lower part to the connecting element, which means permits the displacement of the lower part relative to the upper part along the longitudinal extent, etc.

The connecting elements are connected to the upper part 10 at a respective upper connecting position and to the lower part 12 at a respective lower connecting position. For example, in each case one rotary joint is provided at the connecting positions. In the event of a movement of the upper part 10 and of the lower part 12 relative to one another, the spacing of an upper connecting position relative to a lower connecting position on the same connecting element substantially does not change, that is to say that the spacing is constant with deviations of for example ±1 mm, in particular ±0.3 mm.

Furthermore, the wiper blade 2 has a head end. At the head end there is provided a fastening part 30, that is to say a wiper-blade-side fastening part 30. Along the longitudinal extent of the wiper blade 2, the spacing between the upper part 10 and the lower part 12 becomes smaller proceeding from the head end, at least in regions of the longitudinal extent of the wiper blade or over a predominant part of the longitudinal extent of the wiper blade. Proceeding from the head end, the height of the wiper blade tapers in wedge-shaped fashion in regions, or becomes smaller in regions of the longitudinal extent. For example, in embodiments, for a multiplicity of the connecting elements, the length of the connecting elements may be provided such that the connecting elements provided at the head end are longer than those at the opposite side of the wiper blade along the longitudinal extent.

Figure 6:
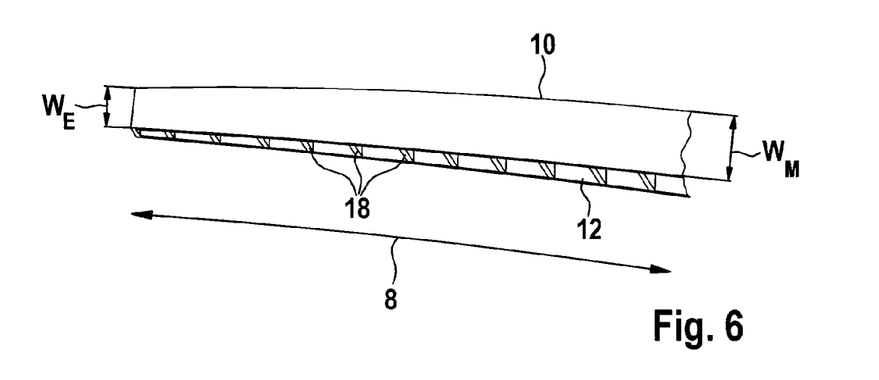
FIG. 6 is a schematic perspective illustration of a wiper arm of a window wiper device according to embodiments of the disclosure.

FIG. 6 is a schematic perspective illustration of a wiper blade 2 of a window wiper device according to embodiments of the disclosure. As illustrated in FIG. 6, the wiper blade 2 has, at the outer connecting positions at which the ends of the elongate upper part 10 and of the lower part 12 are connected to one another, an outer width $W_E$. In typical embodiments, the outer width $W_E$ is at least 15 mm, in particular at least 20 mm, in particular at least 25 mm.

In embodiments of the disclosure that may be combined with other embodiments, the width of the wiper blade 2 increases from the outer connecting positions in the direction of the fastening part 30 or of the bracket 6 at which the wiper blade can be fastened to the window wiper arm. In FIG. 6, by way of example, an inner width is denoted by $W_M$. In typical embodiments, the inner width $W_M$ is at least 20 mm, in particular at least 25 mm, in particular at least 30 mm.

Figure 7A:
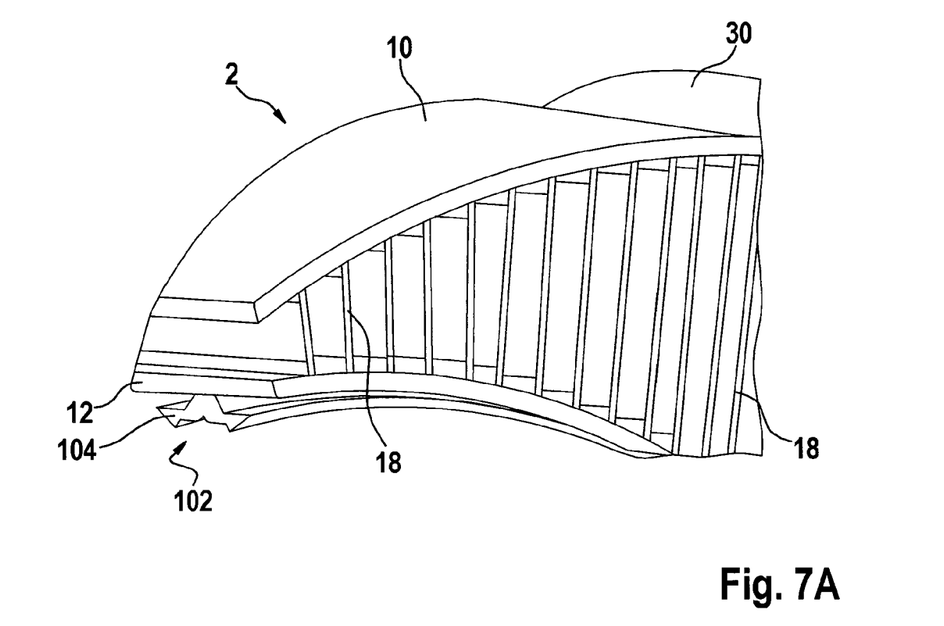
FIG. 7A shows a window wiper device having a wiper lip according to embodiments of the present invention.

FIG. 7A shows a further embodiment of a window wiper device 2, for example of a fin-ray structure, or a further embodiment of a wiper lip 102. The window wiper device 2 comprises an upper part 10 and a lower part 12 which are connected by way of connecting elements 18. Said connecting elements are typically articulatedly connected at least to the lower part 12, such that a movement in accordance with the fin-ray principle can be provided. The upper part 10 and the lower part 12 are connected at a connecting position, at the front in FIG. 7A. Furthermore, the upper part 10 and the lower part 12 are attached to or formed in one piece with an attachment piece 30. The attachment piece 30 serves for fastening to a rotary axle for the wiping of the window or for the fastening to a wiper lever. On the underside of the lower part 12 there are provided two cantilevers 104. One of the cantilevers 104 is illustrated on an enlarged scale in FIG. 7B. In some embodiments described here, which may be combined with other embodiments, the cantilevers are composed of an elastic or rubber-like material which corresponds to the material of the wiper edge 112. In general, the cantilever 104 may, as illustrated by way of example in FIG. 7B, be composed of a different material than at least the lower part 12. The cantilever may be provided from a material with a modulus of elasticity from 1 MPa to 100 MPa.

Embodiments in which the cantilever 104 is composed of a different material than the lower part 12 may be provided for example by way of one of the following methods. The cantilever 104 may be produced as an extruded part which is adhesively bonded to the lower part or which is injection-molded into the lower part. Furthermore, the cantilever 104 may be provided on the lower part 12 by way of a hook-and-loop connection. Other detachably connectable connection options are likewise possible. In this way, the cantilever can be easily applied as a replacement part. Furthermore, the cantilever may be produced in a 2-component injection molding process. This is described for example in FIG. 9.

Figure 7B:
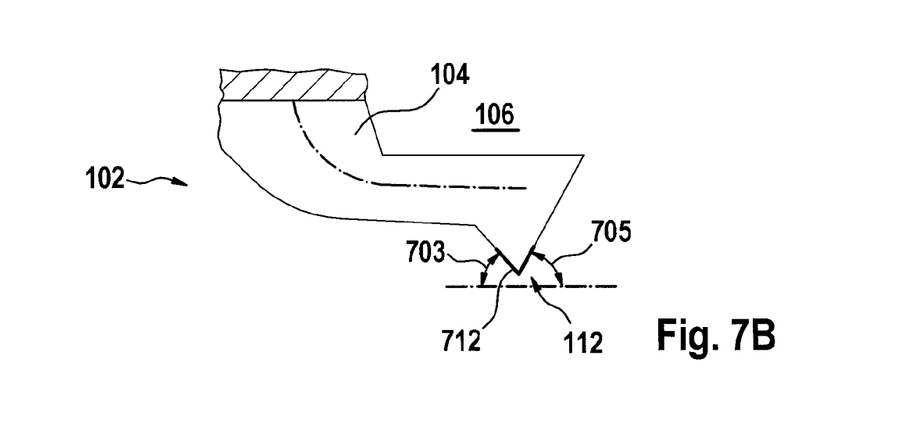

The wiper lip 102 as illustrated in FIG. 7B comprises the cantilever 104 and the wiper edge 112. Here, the cantilever is, proceeding from its base surface at which it is connected or connectable to the lower part 12 of the window wiper device 2, in the form of an arm which extends along the gap 106. The wiper edge 112 is provided on the arm, for example in the form of a wedge angle. Here, an angle 703 and an angle 705 respectively are provided on both sides of the wedge angle 712.

In typical embodiments of the wiper lip that may be combined with other embodiments, the wiper edge comprises an angle a of 60° to 120°, in particular 90°. In this way, a wiper lip with good sealing action between wiper lip and window and with high wiping quality is provided.

In typical embodiments that may be combined with other embodiments described here, the angle 703 and the angle 705 are equal. Furthermore, the angles should as far as possible remain equal even in different operating states in order to make it possible to realize the most uniform possible wiping quality. Measures for reducing possible changes in angle will be described in further embodiments.

In typical embodiments of the wiper lip that may be combined with other embodiments, the wiper lip or the wiper edge may be composed of one or more materials from a group comprising: TPE (thermoplastic elastomer), in particular TPE-S, TPE-O, TPE-U, TPE-A, TPE-V, TPE-E; ethylene propylene diene monomer (EPDM); polychloroprene and natural rubber.

The wiper lip 102 or the cantilever 104 may be provided on the underside of the lower part 12. For this purpose, it is for example possible for an anchoring to the underside of the fin-ray structure to be provided. Furthermore, the cantilever comprises the arm which extends along the gap 106. A wedge angle 712 forms the window contact region. To realize a good cleaning action of a window of a motor vehicle, a certain contact pressure of the wiper edge 112 against the window must be realized. Depending on the selected modulus of elasticity of the material of the wedge angle 712, the angle or angles of the wedge angle may be adapted. The stiffer the material of the wedge angle 712 is, the smaller the angle of the wedge angle can be selected to be. The wedge angle may be provided with a modulus of elasticity of 1 MPa to 100 MPa, wherein there is a dependency between angle and modulus of elasticity.

Figure 8A:
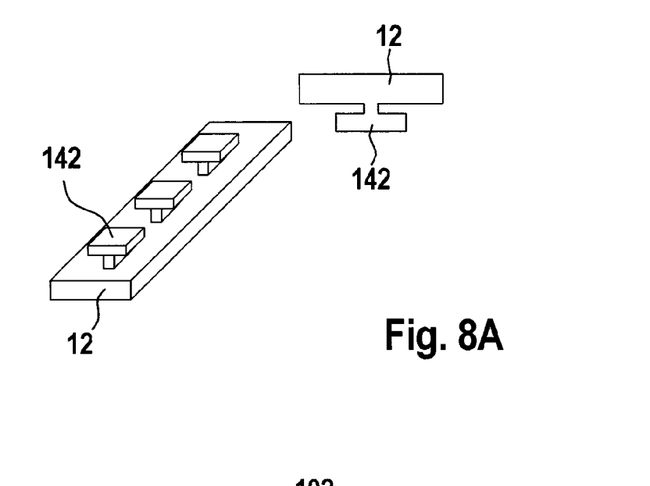
Figure 8B:
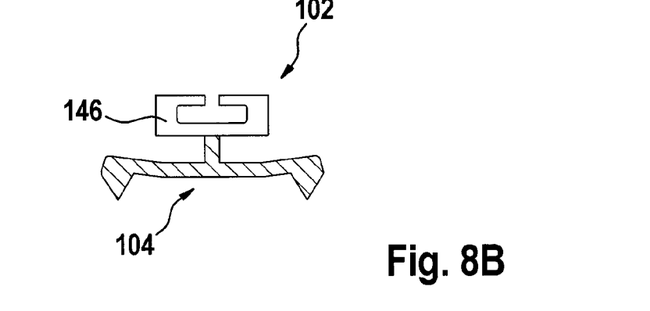
Figure 8C:
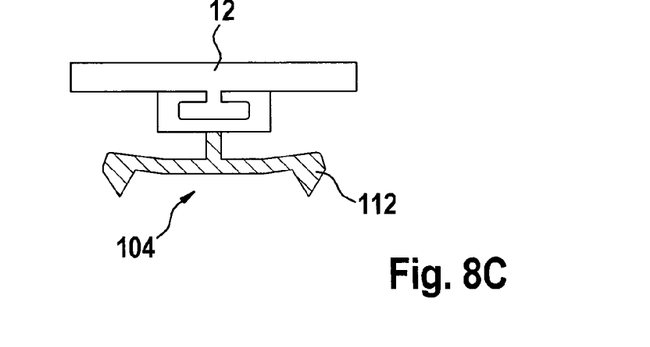

Further embodiments of wiper lips and window wiper device that may be used in particular for fin-ray wipers are shown in FIGS. 8A, 8B and 8C. Here, wiper lips 102 are provided, wherein the wiper lips 102 can be fastened to a lower part 12 of a window wiper device by way of a pushing-in action, clamping and/or clipping. In this way, a wiper lip 102 on the window wiper device can be easily exchanged. It is possible for a refill option to be provided for the commercial market.

FIGS. 8A, 8B and 8C show a further attachment structure, wherein T-shaped elements 142 are provided on the lower part 12 of the window wiper device. Said elements are illustrated in segmented fashion in FIG. 8A, though may also, in other embodiments, extend along the longitudinal extent of the window wiper device. The wiper lip 102 illustrated in FIG. 8B comprises the cantilever 104 with the wiper edge and comprises a fastening element 146. Similarly to FIG. 12, the fastening element is formed with 2 U-shaped structures. The U-shaped structures of the fastening element 146 engage around the T-shaped attachment pieces 142 of the lower part 12. As illustrated in FIG. 8B, the cantilever 104 and the fastening element 146 may be composed of different materials. For example, these may be produced by way of a 2-component injection molding process. It is thus possible for the material characteristics of the cantilever 104 and fastening element 146 to be selected independently of one another. FIG. 8C shows the wiper lip 102 in a state mounted on the lower part 12.

Figure 9:
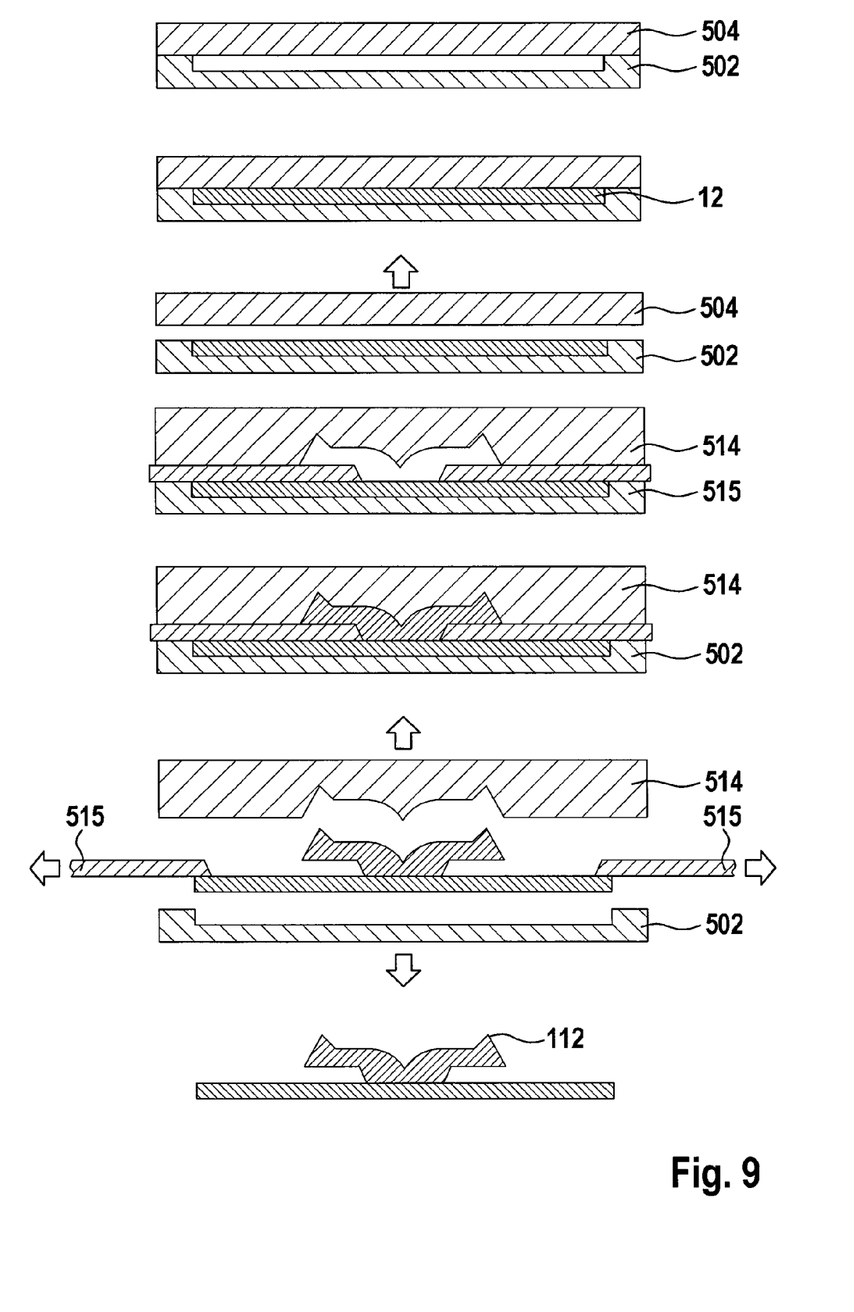
FIG. 9 is a schematic flow diagram for an injection molding process for producing window wiper devices according to embodiments of the present invention.

As already mentioned, a wiper lip according to embodiments of the present invention may be fixedly connected to a lower part of a window wiper device. This may be made possible for example by way of adhesive bonding or by way of a 2-component method, for example a 2-component injection molding process. FIG. 9 schematically shows corresponding sequences for an injection molding process of said type. Firstly, a lower injection mold or a lower tool and an upper injection mold 504 or an upper tool are placed against one another. A cavity or hollow space is formed for the injection molding of the lower part. The lower part 12 is produced in the hollow space formed between the lower injection mold and the upper injection mold. For example, the cavity is filled with plastic. Subsequently, the upper injection mold 504 or an upper tool half is lifted and removed. A second upper injection mold 514, for example a profile cavity, which has a structure corresponding to the cantilever 104, is placed on. Furthermore, a further shape-imparting element or injection molding tools 515 are used which define the gap between the lower part 12 and the cantilever 104. By injection of plastic into the resulting cavity, the cantilevers 104 can be produced.

Through suitable machining of the second upper injection mold 514 in the region of the wiper edge, for example by way of grinding of the injection mold, wherein an edge radius of R=0.1 mm or less (or R=0.05 mm or less) is provided, the cantilevers can be produced with a wiper edge in the injection molding process without the wiper edge having to be reworked at a later point in time.

After the lower injection mold 502, the second upper injection mold 514 and the further injection molding tools 515 have been removed, that is to say the tool has been opened, a structure composed of a lower part 12 and cantilever 104 with wiper edges 112 as per embodiments of the present invention is realized. Since different materials can be used for the filling of the first cavity and the filling of the second profile cavity, a 2-component profile can be realized by injection molding.

Embodiments of the present invention provide wiper lips which reduce or prevent a folding-over action at the turning points of a window wiper device. In typical embodiments, it is the case here that the stiffness perpendicular to the wiping direction is reduced. The stiffness in the wiping direction may for example be greater than the stiffness perpendicular to the wiping direction. Some of the embodiments described here provide, for this purpose, cantilevers 104, which can also be described as monoprofiles. The stiffness is influenced by a gap or a hollow space which is formed by at least one cantilever. The cantilevers typically have a structure such that a gap or hollow space is formed between the cantilever and a lower part of a window wiper device, wherein the gap or hollow space is arranged at a position which is between the cantilever and the lower part along a direction perpendicular to the wiping direction at a position of the wiper edge.

Therefore, in embodiments of the present invention, a wiper lip or a window wiper device can be provided which provides improved contact and improved sealing against the window, wherein in particular, a folding-over action can be reduced or eliminated. It is also possible to reduce the risk of a collision between wiper arm structure, for example the lower part 12, and the window, for example by way of an opposing torsional moment and a stopper or abutment between the wiper lip and underside of the wiper arm. The contact point or the dominant contact point of the window wiper device with the window is not behind the middle point of the wiper arm or a support element of the wiper arm as viewed in the wiping direction, whereby the torsion is increased. Rather, the contact point or the dominant contact point of the window wiper device with the window is shifted forward in the wiping direction, or is, as viewed in the wiping direction, situated in front of the middle of a support element, such as for example the lower part 12, whereby the torsion is reduced.

In embodiments of the present invention that may be combined with other embodiments, a cantilever or some other deformable element is provided for reducing the stiffness perpendicular to the wiping direction. In particular, a cantilever with a wiper edge and with a surface, situated opposite the wiper edge perpendicular to the wiping direction, of the cantilever, wherein the opposite surface is adjoined by a gap or a hollow space.

In typical embodiments, the cantilever has a base surface by way of which the cantilever is connectable or connected to the lower part. One arm extends from the base surface along the gap or the hollow space, wherein in particular, the arm extends from the base surface at least partially in the wiping direction. The wiper lip may furthermore comprise a wiper edge. In typical embodiments, a wiper lip may have at least one of the following dimensions. The base surface may typically have a size of 3 mm to 6 mm in the wiping direction. The gap or hollow space may have a length of 3 mm to 10 mm in the wiping direction. This typically yields a dimension of the gap of 3 mm to 8 mm from the base surface to a perpendicular running through the position of the wiper edge. A height of the gap or of the hollow space, that is to say the dimension of the gap or hollow space in a direction perpendicular to the wiping direction, may be 3 mm to 8 mm.

Figure 10:
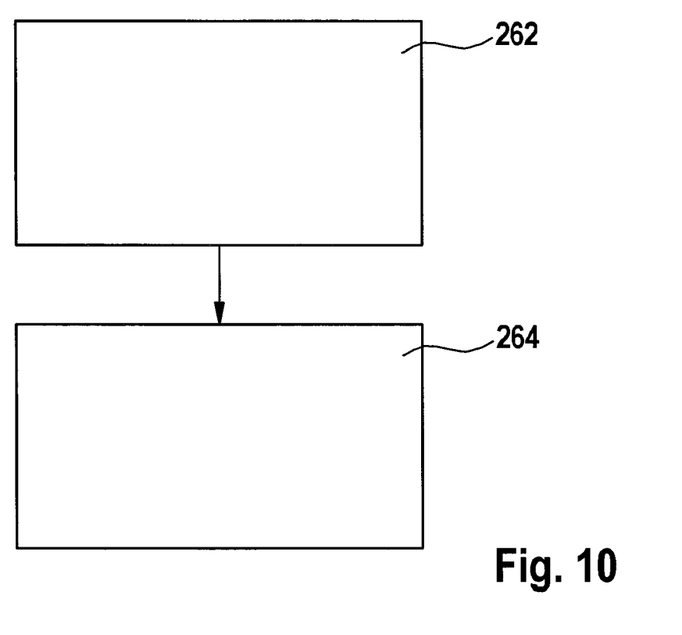
FIG. 10 shows a flow diagram illustrating methods for exchanging wiper edges on wiper lips according to embodiments of the present invention.

FIG. 10 illustrates, by way of a flow diagram, multiple methods for providing a wiper edge on a window wiper device, in particular a fin-ray wiper. As in the embodiments described above, a wiper lip, a cantilever or a wiper edge may be produced separately from the window wiper device. Here, replacement parts can be provided with little material outlay. Therefore, for the embodiments described here, it is possible to realize special methods for providing or exchanging a wiper edge of a wiper lip for a window wiper for a motor vehicle. In a step 262, a wiper lip, a cantilever or a wiper edge is produced or provided. In step 264, the wiper lip, the cantilever or the wiper edge is mounted. This may be realized for example by way of a pushing-on action, a clamping-on action, a plugging-on action or a clipping-on action.

What is claimed is:

1. A window wiper device having a wiper lip (102) and a wiper blade (2) with an elongate upper part (10), which is at least partially of flexible form, with an elongate lower part (12), which is at least partially of flexible form, and with multiple connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and of the lower part relative to one another with a movement component along the longitudinal extent (8) of the wiper blade (2), and wherein the window wiper device (100) is adapted for a vehicle, wherein the wiper lip comprises:
a cantilever structure for reducing stiffness perpendicular to a wiping direction, wherein the cantilever structure includes a fastening region (206) laterally extending between opposite side faces and coupled to the lower part, a flexible, pivoting connecting region (204) extending directly below and from the fastening region and disposed outside of the wiper blade (2), a first cantilever (104) extending perpendicularly away from the connecting region (204) to a greater extent than the fastening region, to a free terminal end, a second cantilever (104) extending perpendicularly away from the connecting region (204) to a greater extent than the fastening region, to a free terminal end, in an opposite direction to the first cantilever (104), a first wedge-shaped wiper edge (112) extending from the terminal end of the first cantilever (104) and having a distal tip configured to engage a windshield, and a second wedge-shaped wiper edge (112) extending from the terminal end of the second cantilever (104) and having a distal tip configured to engage the windshield, wherein the first and second cantilevers (104) and the connecting region (204) form a substantially T-shaped structure, wherein the fastening region resides laterally between the wiper edges and wherein the wiper device extends along a longitudinal extent (8), wherein the first and second cantilevers each extend along a wiping direction that is perpendicular to the longitudinal extent, wherein each of the first and second cantilevers is an elongate structure having a length along the wiping direction that is greater than a length of the first and second wedge-shaped wiper edges (12), wherein the length of the first and second wedge-shaped wiper edges is measured along a direction that is perpendicular to both the wiping direction and the longitudinal extent.

2. The window wiper device as claimed in claim 1, wherein the first cantilever and the second cantilever extend, in each case in a direction parallel to a wiping direction.

3. The window wiper device as claimed in claim 1, wherein the first wiper edge is integrated in the cantilever, and wherein the second wiper edge is integrated in the second cantilever.

4. The window wiper device as claimed in claim 3, wherein the connecting region is, in a cross section perpendicular to the longitudinal extent of the wiper lip, arranged between the first wiper edge and the second wiper edge.

5. The window wiper device as claimed in claim 1, wherein the first wiper edge is mounted on the first cantilever, and wherein the second wiper edge is mounted on the second cantilever.

6. The window wiper device as claimed in claim 5, wherein the connecting region is, in a cross section perpendicular to the longitudinal extent of the wiper lip, arranged between the first wiper edge and the second wiper edge.

7. The window wiper device as claimed in claim 1, wherein a surface of the wedge-shaped wiper edge comprises an angle of 60° to 120° relative to the windshield in an unstressed state of the wiper lip.

8. The window wiper device as claimed in claim 1, wherein the first wiper edge is composed of a material from the group comprising: TPE (thermoplastic elastomer); ethylene propylene diene monomer (EPDM); polychloroprene and natural rubber.

9. The window wiper device as claimed in claim 1, wherein the first cantilever and the second cantilever extend, in each case in a direction parallel to a wiping direction, wherein the connecting region is arranged between the first wiper edge and the second wiper edge.

10. The window wiper device as claimed in claim 1, wherein the first wiper edge is integrated in the first cantilever, wherein the first wiper edge and the first cantilever are composed of the same material, wherein the second wiper edge is integrated in the second cantilever, and wherein the second wiper edge and the second cantilever are composed of the same material.

11. The window wiper device as claimed in claim 1, wherein the first wiper edge is mounted on the first cantilever, wherein the first wiper edge and the first cantilever comprise different materials, and wherein the second wiper edge is mounted on the second cantilever, wherein the second wiper edge and the second cantilever comprise different materials.

12. The window wiper device as claimed in claim 1, wherein a surface of the wedge-shaped wiper edge comprises an angle of 90° relative to the windshield in an unstressed state.

13. The window wiper device as claimed in claim 1, wherein the first wiper edge is composed of a material from the group comprising: TPE-S, TPE-O, TPE-U, TPE-A, TPE-V, TPE-E; ethylene propylene diene monomer (EPDM); polychloroprene and natural rubber.

* * * * *